May 25, 1926.
C. GIRL
AUTOMOBILE BUMPER
Filed August 30, 1922
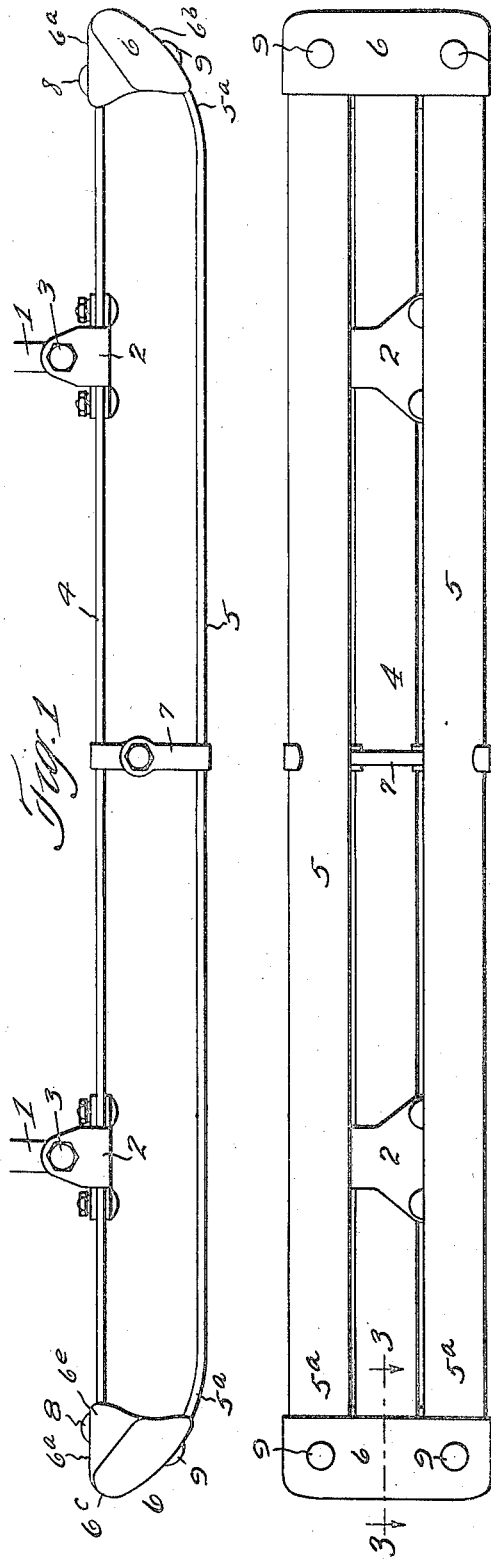
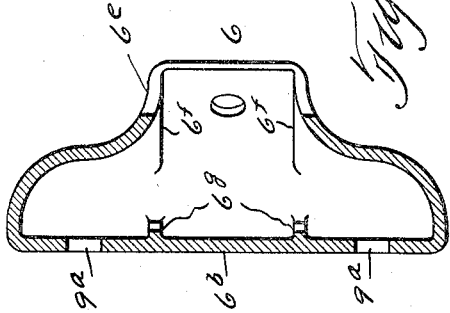
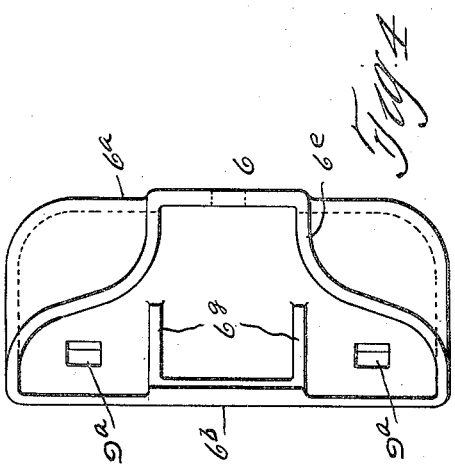
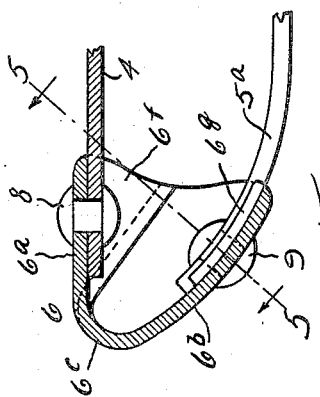
Inventor
Christian Girl
By
Neul Brock & West
Attys.

Patented May 25, 1926.

1,585,974

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed August 30, 1922. Serial No. 585,173.

This invention relates generally to automobile bumpers and it has for its object to provide a bumper of simple construction which can be easily and economically manufactured, one which can be quickly and easily attached to or detached from an automobile, and one which on account of its special features of construction will provide ample protection to the automobile and still be able to withstand the usual shocks and strains without impairment.

With these objects in view and certain others which will become apparent as the description proceeds the invention consists in the novel features of construction and in the manner of combining or arranging the same, all of which will be fully described hereinafter and set forth in the appended claims.

In the drawings forming a part of this specification Fig. 1 is a top plan view of a bumper constructed in accordance with my invention; Fig. 2 is a front view of the same; Fig. 3 is a detail sectional view on the line 3—3 of Fig. 2; Fig. 4 is an elevation of one of the caps; and Fig. 5 is a detail sectional view on the line 5—5 of Fig. 3 looking in the direction of the arrows.

Referring to the drawings 1, 1 indicates the usual forwardly projecting bumper-supporting members of an automobile or similar vehicle to the forward ends whereof are secured the clamps 2 by means of bolts 3 extending through the stems or arms of such clamps and the ends of such members, whereby the automobile bumper is securely connected to the frame of the automobile. The bumper consists of a rear bar 4 and the front bars 5, the adjacent ends of said bars being connected to the end caps 6, thereby providing, with the central brace member 7, the complete bumper. The rear bar 4 is preferably straight from end to end, whereas the front bars 5 are straight for the greater portion of their lengths, but are curved rearwardly, as shown at 5ª, adjacent their opposite ends and at points where they are connected to the cap pieces 6. The central brace 7 may be of any desired construction capable of engaging and maintaining in their proper relative positions the rear bar 4 and the front bars 5, said front bars being spaced apart by being arranged one above the other, shown, in order to provide a broad-faced bumper. The caps 6, which are secured to the ends of the bars 4 and 5 for the purpose of uniting said ends and providing the proper connecting finish without impairing in the least the resiliency of both the front and rear bars, are preferably made of light cast metal and these caps are hollow or cored, as most clearly shown in Figs. 3 and 5. The vertical length of the front of each cap is sufficient to embrace both of the front bars 5, but, for the sake of lightness, each cap is made tapering toward the rear to provide a narrow seat projection for the reception of the end of the single bar therein. The rear walls 6ª of the caps are made straight, as shown, while the forward walls 6ᵇ are curved, the front and rear walls meeting in a rounded corner 6ᶜ. The rearwardly extending portion 6ᵉ is of sufficient width to receive the end of the rear bar 4 and a rivet 8 securely connects this end of the bar to the cap and, inasmuch as the end of the bar is held between the shouldered portions 6ᶠ, all danger of movement is avoided and the greater portion of the strain upon the rivet relieved. The curved forward walls of the caps correspond to the curvature of the ends 5ª of the front bars 5. In practice I prefer to provide the inner faces of said walls with the ribs or shoulders 6ᵍ which the proximate edges of the bars 5 engage, the opposite edges of such bars engaging the top and bottom portions of the cap. The ends of the bars 5 are anchored to their respective caps by rivets 9 passing through the forward wall of each such cap and through the ends of the front bars. In practice I prefer to make the rivet holes 9ª square or polygonal in cross section.

By making the cap in the manner described an exceedingly light structure is produced and one which will have considerable strength, enabling the use of aluminum or some similar light material in the manufacture of the caps. The shape of the caps and the provision of the reinforcing ribs or shoulders, which likewise perform bar-positioning functions, render the caps strong and durable.

It is obvious that the ends of a single rear bar and the ends of the two front bars can be quickly and easily connected to the caps and that it will be impossible to improperly connect the ends of the bars to the caps; and when the bars and caps are connected together the bumper as a whole has been assembled to which the connecting brace 7 and the fastening clamps 2 can be connected. The device is then ready for attachment to the front of the automobile.

Connecting the rear bar to the front bars by means of the caps and the central brace insures resiliency within certain limits, and the front bars themselves are also capable of yielding at various points within certain limits; and by connecting all of the parts in the manner herein shown, a light, strong and durable bumper is provided which will readily respond to ordinary shocks or strains and which will immediately resume its normal formation when such shocks or strains are removed.

The caps, having rounded corners, prevent injury from laterally delivered blows or strains and, when subjected to sudden shocks, promptly communicate the same to the resilient bars constituting the major portion of the bumper. It will thus be seen that I provide a simple and inexpensive construction of bumper and one which will properly carry out all of the objects hereinbefore referred to and function in the manner designed.

It will be noted that the bars 4 and 5 are substantially parallel throughout their entire length, the end portions 5ª being short. It will also be seen that the bars 4 and 5 are of substantially the same length, the latter bar being but slightly longer than the former bars. This enables me to manufacture bumpers under quantity production, at a great saving of expense as compared with bumpers of the type wherein all the bars are of different lengths and all of which have to be specially shaped prior to assembling. The bars for the bumper disclosed herein can be made straight, or substantially straight, throughout their entire length.

For convenience of description, the bumper is assumed to be applied to the front of an automobile and the terms "front" and "rear" are employed accordingly, but without any intention of limiting the use of the application of the bumper to any particular part of the automobile.

Having thus described my invention, what I claim is:

1. An automobile bumper comprising a rear bar and a plurality of front bars, and hollow caps connecting the ends of said outer and rear bars, the outer walls of said caps being curved and the corners of said caps being rounded.

2. An automobile bumper comprising a rear bar and a plurality of front bars, said rear bar being straight from end to end and the front bars being curved at their ends, hollow caps to which the ends of said front and rear bars are connected, the front walls of said caps being curved in conformity with the curved ends of the front bars, the rear walls of said caps being straight and the corners of said caps being rounded.

3. An automobile bumper comprising a rear bar and a plurality of front bars, said rear bar being straight and the ends of the front bars being curved, hollow caps to which the ends of the bars are connected, the front walls of said caps being curved to correspond with the curvature of the ends of the front bars, the caps being reduced in size at their rear ends and shaped to receive the ends of the rear bars and provided with means upon their front walls for positioning the front bars with reference to the caps and with reference to each other.

4. An automobile bumper comprising a straight rear bar and a plurality of front bars having their ends curved rearwardly, and hollow caps having straight rear walls, curved outer walls and rounded corners, the front walls having ribs upon their inner faces for positioning the ends of the front bars, the rear portions of the caps being contracted and shaped to receive the ends of the rear bar.

5. An automobile bumper comprising a straight rear bar and a plurality of front bars having their opposite ends curved rearwardly, and hollow caps to which the ends of said bars are connected, the rear portion of each cap being contracted and shaped to receive an end of the rear bar, the rear face of the front wall of each cap being formed with parallel ribs or shoulders for positioning the ends of the front bars with reference to the cap and with reference to each other, the front wall of the cap being curved to correspond with the curvature of the end of the bar secured thereto, the corners of said caps being rounded.

6. An automobile bumper comprising a rear bar and a plurality of front bars, and hollow caps connecting the ends of said front and rear bars, the front walls of said caps being curved.

7. An automobile bumper comprising a rear bar and a plurality of front bars, the front bars being curved at their ends, and hollow caps to which the ends of said front and rear bars are connected, the front walls of said caps being curved in conformity with the curved ends of the front bars and the rear walls of said caps being straight.

8. An automobile bumper comprising a rear bar and a plurality of front bars, and hollow caps to which the ends of the bars are connected, the caps being reduced in size at their rear ends and shaped to receive the ends of the rear bars and provided with means upon their front walls for positioning the front bars with reference to the caps and with reference to each other.

9. An automobile bumper comprising a rear bar and a plurality of front bars having their ends curved rearwardly, and hollow caps having straight rear walls and curved outer walls, the front walls having ribs upon their inner faces for positioning the ends of the front bars, the rear portions of the caps being contracted and shaped to receive the ends of the rear bar.

10. An automobile bumper comprising a rear bar and a plurality of front bars having their opposite ends curved rearwardly, and hollow caps to which the ends of said bars are connected, the rear portion of each cap being shaped to receive an end of the rear bar, the rear face of the front wall of each cap being formed with parallel ribs or shoulders for positioning the ends of the front bars with reference to the cap and with reference to each other and the front wall of the cap being curved to correspond with the curvature of the end of the bar secured thereto.

11. An automobile bumper comprising a pair of vertically spaced front or impact bars and a rear or auxiliary bar, the front or impact bars having vertically spaced ends and the rear or auxiliary bar having an end located rearwardly or inwardly with respect to the corresponding ends of the first mentioned bars and vertically spaced from such ends, and an end member uniting such ends of the said bars in such spaced relation.

12. An automobile bumper comprising a rear or auxiliary bar and a pair of front or impact bars, the ends of the front bars being vertically spaced and the rear bar having an end spaced vertically and rearwardly or inwardly with respect to the corresponding ends of the front or impact bars, and an end member uniting such ends of the said bars and having seats arranged to maintain such ends in such spaced relation.

13. An automobile bumper comprising a rear or auxiliary bar and a pair of front or impact bars, the ends of the front or impact bars being vertically spaced and the rear or auxiilary bar having an end spaced vertically and rearwardly or inwardly from the corresponding ends of the front or impact bars, and an end connection uniting such corresponding ends of the said bars in such spaced relationship.

14. An automobile bumper comprising a pair of vertically spaced front or impact bars and a rear or auxiliary bar, the front or impact bars having vertically spaced ends and the rear or auxiliary bar having ends spaced vertically and rearwardly or inwardly from the corresponding ends of the first-mentioned bars, and end connections uniting proximate ends of the said bars in such spaced relationship.

15. An automobile bumper comprising a rear or auxiliary bar and a pair of front or impact bars, the ends of the front or impact bars being vertically spaced and the central portion of each end of the rear or auxiliary bar being spaced vertically and rearwardly or inwardly from the corresponding ends of the front or impact bar, and end connections each having seats for the reception of such spaced ends of said bars and connecting the same.

16. An automobile bumper comprising a rear or auxiliary bar and a pair of front or impact bars, the ends of the front or impact bars being vertically spaced and the central portion of each end of the rear or auxiliary bar being spaced vertically and rearwardly or inwardly from the corresponding ends of the front or impact bars, and end connections for the said bars, each such connection having seats for the reception of the spaced proximate ends of said impact bars.

17. An automobile bumper comprising a rear or auxiliary bar and a pair of front or impact bars, the ends of the front or impact bars being vertically spaced and the central portion of each end of the rear or auxiliary bar being spaced vertically and rearwardly or inwardly from the corresponding ends of the front or impact bars, and end connections uniting such corresponding ends of the said bars.

18. An automobile bumper comprising a rear or auxiliary bar and a pair of front or impact bars, the ends of the front or impact bars being vertically spaced and the central portion of each end of the rear or auxiliary bar being spaced vertically and rearwardly or inwardly from the corresponding ends of the front or impact bars, end connections uniting such corresponding ends of the said bars and provided with upper and lower seats for the ends of the front or impact bars, and means for securing the ends of said bars to their respective end connections.

19. An automobile bumper comprising a rear or auxiliary bar and a pair of front or impact bars, the ends of the front or impact bars being vertically spaced and the rear or auxiliary bar having an end spaced vertically and rearwardly or inwardly from the corresponding ends of the front or impact bars, and an end connection uniting such corresponding ends of the said bars, the said connection having vertically spaced seats for the reception of the ends of the said impact bars.

20. An automobile bumper comprising front and rear bars, and complementary members connected to the ends of said bars and spacing them both horizontally and vertically.

21. An automobile bumper comprising a rear or auxiliary bar and a pair of front or impact bars, the ends of the front bars being vertically spaced and the rear bar having an end spaced vertically and rearwardly or inwardly with respect to the corresponding ends of the front or impact bars, and a unitary member uniting such bar ends in spaced relation.

22. An automobile bumper comprising a rear or auxiliary bar and a pair of front or impact bars, the ends of the front bars being vertically spaced and the rear bar having an end spaced vertically and rearwardly or inwardly with respect to the corresponding ends of the front or impact bars, a unitary end member receiving such bar ends, and means connecting each such bar end to said member.

In testimony whereof, I hereunto affix my signature.

CHRISTIAN GIRL.